(12) United States Patent
Tsai et al.

(10) Patent No.: US 6,184,314 B1
(45) Date of Patent: Feb. 6, 2001

(54) VINYL ESTER OF POLYEPOXIDE AND UNSATURATED MONOCARBOXYIC ACID WITH MALEIC STABILIZER

(75) Inventors: Jan-Yang Tsai, Nan Tou; Shih-Wen Yur, Taichung, both of (TW)

(73) Assignee: Swancor Industrial Co., Ltd., Nan Tou (TW)

( * ) Notice: Under 35 U.S.C. 154(b), the term of this patent shall be extended for 0 days.

(21) Appl. No.: 09/272,529

(22) Filed: Mar. 22, 1999

(51) Int. Cl.$^7$ .................. C08K 5/092; C08G 59/17; C08L 63/10
(52) U.S. Cl. .................. 525/531; 523/455; 525/530; 525/922
(58) Field of Search .................. 525/530, 531, 525/922; 523/455

(56) References Cited

U.S. PATENT DOCUMENTS

| | | | | |
|---|---|---|---|---|
| 4,146,452 | * | 3/1979 | Weber et al. | 525/531 |
| 4,413,105 | * | 11/1983 | Koenig | 525/531 |
| 4,480,077 | * | 10/1984 | Hefner, Jr. | 525/530 |
| 5,378,743 | * | 1/1995 | Liedtke | 523/523 |
| 5,861,466 | * | 1/1999 | Hartinger | 525/531 |

FOREIGN PATENT DOCUMENTS 59-21796 * 2/1984 (JP).

* cited by examiner

Primary Examiner—Robert E. L. Sellers
(74) Attorney, Agent, or Firm—Harrison & Egbert

(57) ABSTRACT

A vinyl ester resin derived from the reaction of about equivalent amounts of an unsaturated monocarboxylic acid and a polyepoxide is stabilized with from 0.01 to 5 weight percent of maleic acid and/or maleic anhydride.

2 Claims, No Drawings

VINYL ESTER OF POLYEPOXIDE AND UNSATURATED MONOCARBOXYIC ACID WITH MALEIC STABILIZER

FIELD OF THE INVENTION

The present invention relates generally to a vinyl ester resin, and more particularly to a method prolonging the storage life of thermosettable vinyl ester resins.

BACKGROUND OF THE INVENTION

Thermosettable resins generally have limited shelf lives, i.e, upon storage at ambient temperatures the resins undergo premature gelation which, of course, is undesirable. Generally, the tendency of a resin to gel increases as the storage temperature increases and is also dependent on the choice of reactants and on the kind and amount of monomer which is generally mixed with the resin.

Thermosettable vinyl ester resins, unsaturated polyesters or mixtures thereof have similar shelf life or storage stability problems. In the past, attempts with known stabilizing materials to prevent gelation have also resulted in an undesirable increase in the catalyzed gel times of the resins and adversely affected the curability of the resin. Typical of inhibitors taught by the art are certain hydroxyamines as proposed in U.S. Pat. No. 3,408,422 and phenothiazine taught in U.S. Pat. No. 3,683,045.

SUMMARY OF THE INVENTION

The primary objective of the present invention is therefore to provide the method prolonging storage life of thermosettable vinyl ester resins by adding a stabilizer or stabilizing agent, maleic acid or maleic anhydride in small proportions, for greatly increasing the storage life of thermosettable vinyl ester resins without suppressing the exotherm or adversely affecting their curability.

The effective proportions of maleic acid or maleic anhydride range from 0.01% –5.0% by weight on the weight of resin.

DETAILED DESCRIPTION OF THE INVENTION

The thermosettable polymer compositions include a vinyl ester resin or an unsaturated polyester or blends and mixtures of those two materials.

Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al also describes in U.S. Pat. No. 3,256,226 vinyl ester resins wherein the molecular weight of the polyepoxide is increased by reacting a dicarboxylic acid with the polyepoxide resin as well as acrylic acid, etc. Rubber modified vinyl ester resins are described in U.S. Pat. No. 3,892,819 to Daniel. Daniel describes vinyl ester resins modified by liquid carboxy terminated polybutadiene rubber. Other difunctional compounds containing a group which is reactive with an epoxide group, such as an amine, mercaptan, and the like, may be utilized in place of the dicarboxylic acid. All of the above-described resins, which contain the characteristic linkages

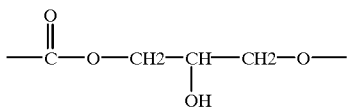

and terminal, polymerizable vinylidene groups, are classified as vinyl ester resins, and are incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, epoxy novolacs, epoxidized diolefins, epoxidized diunsaturated acid esters, rubber-modified polyepoxides as well as epoxides of unsaturated polyesters, as long as they contain more than one oxirane group per molecule.

Preferred polyepoxides are glycidyl polyethers of polyhydric alcohols or polyhydric phenols having weights per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohyrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof. Also included within the term "unsaturated carboxylic acids" are the hydroxyalkyl acrylate or methacrylate half esters of dicarboxylic acids as described in U.S. Pat. No. 3,367,992 wherein the hydroxyalkyl group preferably has from 2 to about 6 carbon atoms.

Polymerization inhibitors, commonly called process inhibitors, such as t-butyl catechol, monomethyl ether of hydroquinone (MEHQ) or hydroquinone, are advantageously added to prevent premature polymerization during the preparation of the vinyl ester resin.

Vinyl ester/unsaturated polyester resin blends are also effectively stabilized. The blends may be prepared either by physically mixing the two resins in the desired proportions or by preparing the vinyl ester resin in the presence of the unsaturated polyester.

Preferably, the thermosettable resin phase comprises from 40 to 70 weight percent of the vinyl ester and from 60 to 30 percent of a copolymerizable monomer.

Suitable monomers include vinyl aromatic compounds such as styrene, vinyl toluene, divinyl benzene and the like. Other useful monomers include the esters of saturated alcohols such as methyl, ethyl, isopropyl, octyl, etc., with acrylic acid or methacrylic acid:vinyl acetate, diallyl maleate, dimethyallyl fumarate:divinyl monomers or multifunctional (meth) acrylate monomers such as tripropylene glycol diacrylate, trimethylol propane triacrylate, mixtures of the same and all other monomers which are capable of copolymerizing with the vinyl ester resin.

When maleic acid or its anhydride is used as the sole stabilizer it is usually effective at a concentration of from 0.01 to 5 percent by weight on the weight of resin. Higher amounts than 5% can be used and will improve the stability. Preferably, the amount to be used is from 0. 1% to 2%.

Catalysts that may be used for the curing or polymerization are preferably the peroxide and hydroperoxide catalysts such as benzoyl peroxide, lauroyl peroxide, cumene hydroperoxide, t-butyl hydroperoxide, methyl ethyl ketone peroxide (MEKP), t-butyl perbenzoate, and the like. The amount of the catalyst added will vary preferably from 0.1 percent to about 5 percent:by weight of the resin phase.

Preferably, the cure of the resin can be initiated at room temperature by the addition of known accelerating agents or promoters such as lead, potassium or cobalt naphthenate, cobalt octoate, N.N-dimethyl aniline, N.N-dimethyl-p-toluidine and the like usually in concentrations ranging from 0.01 to 1.5 weight percent. The promoted resin means that the promoter or accelerating agent have been added in the said unpromoted resin. The promoted composition of resin/monomer, when mixed with catalysts, will usually be converted to at least a gel state in a few minutes and cured to a solid state in 30 minutes to one or two hours. That time may vary widely depending upon the particular resin and vinyl monomer used, the catalyst/promoter system employed and its concentration, the temperature and other known factors. Similar results are observed when the usual process inhibitors are present that were added during the preparation of the resin. In amounts necessary to achieve that objective, such process inhibitors do not improve the storage stability of the composition to a significant extent. When used in amounts sufficient to provide storage stability, the gelation and cure rates are increased to unacceptable levels. It is an advantage of this invention that the process stabilizer can be employed in that minimum amount needed during resin preparation and that the stabilizer systems of this invention can be employed to provide the desired storage stability without unacceptable effects on gelation and cure.

The stabilizing agent is usually added to the prepared resin either before or after admixture with the vinyl monomer. Maleic anhydride can extend the shelf life of the resins 2 times or more in unpromoted or promoted formulation. It is preferred to add the stabilizer into the prepared resin.

The benefits and advantages of the present invention and the best mode for carrying out the same as illustrated in the following examples wherein all parts and percents are by weight unless otherwise specified.

The following resins were prepared and tested for storage stability under accelerated conditions of storage at 60° C. and 78° C. A tested sample was considered as gellation when some resin has lost its flowability and remains at the bottom. If the storage time in accelerated conditions is longer, then the storage life in ambient condition will be much longer. Promoted resin in the following example is meant that the tested resins were already mixed with cobalt octoate, which dosage is 0.4% by weight on the weight of resin.

EXAMPLE 1

Bisphenol A was catalytically reacted with NPEL—128 (a glycidyl polyether of bisphenol A having an Epoxy Equivalent Weight of 186–192) at 150° C. under a nitrogen atmosphere for 1 hour to form a polyepoxide having an Epoxy Equivalent Weight (EEW) of 535. After cooling to 110° C. additional NPEL—128 was added with methacrylic acid and reacted to a carboxyl content of about 2–3 percent. Then maleic anhydride was added and reacted therewith until the epoxy equivalent weight is larger than 10000. The final resin (Resin A) diluted with styrene and contained approximately:

| | |
|---|---|
| Bisphenol A | 7.7% |
| NPEL-128 | 25.1% |

-continued

| | |
|---|---|
| methacrylic acid | 8.7% |
| NPEL-128 | 11.6% |
| maleic anhydride | 1.9% |
| styrene | 45% |

0.5 phr maleic acid and maleic anhydride were added to said resin A and tested under accelerated storage conditions of 60° C. and 78° C. with the results recorded in the table below. A control, with no maleic acid and maleic anhydride, was also run.

TABLE 1

The effect of maleic acid & anhydride on the stability of Resin A

| | Accelerated Temperature | | | |
|---|---|---|---|---|
| | 78° C. | | 60° C. | |
| sample | unpromoted resin | promoted resin | unpromoted resin | promoted resin |
| Resin A | 48 | 27 | 648 | 69 |
| Resin A + 0.5 phr maleic anhydride | 168 | 69 | 648 | 168 |
| Resin A + 0.5 phr maleic acid | 172 | 69 | 672 | 148 | unit: hours
phr: part per hundred part of resin

EXAMPLE 2

Vinyl ester resin B was prepared by reacting about 1 equivalent of methacrylic acid with 0.75 equivalent of an epoxy novolac having an epoxy equivalent weight (EEW) of 175–182 (NPPN—638) and 0.25 equivalent of a glycidyl polyether of bisphenol A having an EEW of 186–192 (NPEL—128). The above reactants were heated to 115 C with catalyst and hydroquinone present until the carboxylic acid content reached about 1 percent. The reactants were cooled and then styrene (containing 50 ppm of t-butyl catechol) was added. The final resin B contained

| | |
|---|---|
| styrene | 36% |
| methacrylic acid | 20.6% |
| NPPN 638 | 32.1% |
| NPEL-128 | 11.3% |
| Hydroquinone | 165 ppm |

0.5 phr maleic acid and maleic anhydride were added to said resin B and tested under accelerated storage conditions of 60° C. and 78° C. The result was recorded in the table 2 as below. A control with no any maleic acid or maleic anhydride was also run.

TABLE 2

The effect of maleic acid & anhydride on the stability of Resin B

| | Accelerated Temperature | | | |
| | 78° C. | | 60° C. | |
| sample | unpromoted resin | promoted resin | unpromoted resin | promoted resin |
|---|---|---|---|---|
| Resin B | 101 | 27 | 507 | 148 |
| Resin B + 0.5 phr maleic anhydride | 132 | 69 | 630 | 252 |
| Resin B + 0.5 phr maleic acid | 252 | 69 | 648 | 252 |

EXAMPLE 3

Vinyl ester Resin C was prepared by reacting firstly with liquid carbonyl-terminated rubber (Hycar CTBN, Goodrich Chemical Co.) and a glycidyl polyether of bisphenol A having an EEW of 250. The above reactant were heated to 115° C. with catalyst until acid number reached to 5. Then methacrylic acid was added and reached at 115° C. until acid number was below 10, and styrene monomer was added and cooled. The final resin C contained approximately

| | |
|---|---|
| styrene | 45% |
| Epoxy resin | 36% |
| methacrylic acid | 10.9% |
| Hycar CTBN | 8.1% |

The following result was obtained (as Table 3) when Resin C was added with or without maleic acid and maleic anhydride based on the same procedure and testing method as Example 2.

TABLE 3

The effect of maleic acid & anhydride on the stability of Resin C

| | Accelerated Temperature | | | |
| | 78° C. | | 60° C. | |
| sample | unpromoted resin | promoted resin | unpromoted resin | promoted resin |
|---|---|---|---|---|
| Resin C | 22 | 22 | 86 | 86 |
| Resin C + 0.5 phr maleic anhydride | 84 | 70 | 230 | 230 |
| Resin C + 0.5 phr maleic acid | 112 | 112 | 450 | 450 | unit: hours

EXAMPLE 4

Various amounts of maleic anhydride were added to Resin A and tested at 60° C. and 78° C. The result of accelerated storage life was recorded as the follow table 4.

TABLE 4

The effect of dosage on the stability of Resin A

| | Accelerated Temperature | | | |
| | 78° C. | | 60° C. | |
| sample | unpromoted resin | promoted resin | unpromoted resin | promoted resin |
|---|---|---|---|---|
| Resin A | 41 | 41 | 470 | 41 |
| Resin A + 0.05 phr maleic anhydride | 36 | 24 | 567 | 108 |
| Resin A + 0.3 phr maleic anhydride | 65 | 65 | 1128 | 425 |
| Resin A + 0.5 phr maleic anhydride | 168 | 96 | 1272 | 1121 |

Note: Resin A in this sample is different batch from example 1.

From the above examples, we can get the following conclusion:

(1). Maleic acid and maleic anhydride can obviously improve the storage life of vinyl ester resin, even "unpromoted resin" and "promoted resin".

(2). Maleic acid and maleic anhydride can provide stabilized effect for any kind of vinyl ester resin, which is fundamentally consisting of a vinyl ester function.

(3). The dosage of maleic anhydride or acid will affect the storage life of vinyl ester resin. The effective dosage is 0.01% ~5% by weight on the weight of resin.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

We claim:

1. A thermosettable resin having an improved storage life comprising:

a vinyl ester resin prepared by reacting about equivalent amounts of are unsaturated monocarboxylic acid and a polyepoxide resin; and a stabilizer having between 0.01 to 5 weight percent of the total composition of a resin selected from the group consisting of maleic acid, maleic anhydride and a mixture thereof, said stabilizer being mixed with said vinyl ester resin subsequent to preparation thereof.

2. The thermosettable resin of claim 1, wherein said vinyl ester resin has a function group consisting of

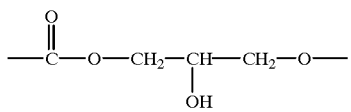

* * * * *